(12) United States Patent
Quere (10) Patent No.: US 8,288,916 B2
(45) Date of Patent: Oct. 16, 2012

(54) COMPOSITE ELECTROMECHANICAL MACHINES WITH UNIFORM MAGNETS

(76) Inventor: Eric Stephane Quere, Los Altos, CA (US)

( * ) Notice: Subject to any disclaimer, the term of this patent is extended or adjusted under 35 U.S.C. 154(b) by 46 days.

(21) Appl. No.: 12/210,171

(22) Filed: Sep. 12, 2008

(65) Prior Publication Data

US 2009/0206692 A1    Aug. 20, 2009

Related U.S. Application Data

(60) Provisional application No. 60/993,904, filed on Sep. 13, 2007, provisional application No. 60/993,961, filed on Sep. 13, 2007.

(51) Int. Cl.
*H02K 16/02* (2006.01)
(52) U.S. Cl. .................... 310/266; 310/112
(58) Field of Classification Search .............. 310/266, 310/268, 112–114
See application file for complete search history.

(56) References Cited

U.S. PATENT DOCUMENTS

| | | | | |
|---|---|---|---|---|
| 1,690,953 A * | 11/1928 | Schon | | 318/769 |
| 3,603,823 A * | 9/1971 | Mason | | 310/46 |
| 4,187,441 A * | 2/1980 | Oney | | 310/112 |
| 4,794,286 A | 12/1988 | Taenzer | | |
| 5,783,893 A * | 7/1998 | Dade et al. | | 310/266 |
| 5,793,136 A * | 8/1998 | Redzic | | 310/114 |
| 5,907,199 A * | 5/1999 | Miller | | 310/12.14 |
| 6,373,160 B1 * | 4/2002 | Schrodl | | 310/114 |
| 6,590,312 B1 * | 7/2003 | Seguchi et al. | | 310/266 |
| 6,710,492 B2 | 3/2004 | Minagawa | | |
| 6,727,632 B2 * | 4/2004 | Kusase | | 310/266 |
| 6,924,574 B2 | 8/2005 | Qu et al. | | |
| 6,998,757 B2 | 2/2006 | Seguchi et al. | | |
| 7,154,191 B2 | 12/2006 | Jansen et al. | | |
| 7,154,192 B2 | 12/2006 | Jansen et al. | | |
| 7,154,193 B2 | 12/2006 | Jansen et al. | | |
| 7,230,363 B2 * | 6/2007 | Stout et al. | | 310/266 |
| 7,250,702 B2 | 7/2007 | Abou Akar et al. | | |
| 7,400,077 B2 * | 7/2008 | Caroon | | 310/266 |
| 7,723,888 B2 * | 5/2010 | Petek | | 310/156.35 |
| 2006/0175923 A1 | 8/2006 | Abou Akar et al. | | |

FOREIGN PATENT DOCUMENTS

WO    WO2005/117243    * 12/2005

\* cited by examiner

*Primary Examiner* — Dang D Le
(74) *Attorney, Agent, or Firm* — Tue Nguyen (57) ABSTRACT

Embodiments of the present invention include a composite electromechanical machine which can operate as a motor or a generator (including dynamo or alternator). In an aspect, the present composite electromechanical machine includes at least a double-sided magnetic plane (e.g., rotor or stator) wherein the double-sided magnetic plane includes a plurality of magnet protruding from both sides and exerting substantially equal magnetic field to both sides of the double-sided magnetic plane. The magnets can be permanent magnets or electromagnets having windings. Other embodiments can also be included.

19 Claims, 10 Drawing Sheets

COMPOSITE ELECTROMECHANICAL MACHINES WITH UNIFORM MAGNETS

This application claims priority from U.S. provisional patent application Ser. No. 60/993,904, filed on Sep. 13, 2007, entitled "Multiple layer (brush/brushless)"; and from U.S. provisional patent application Ser. No. 60/993,961, filed on Sep. 13, 2007, entitled "Double rotator, brush", which are incorporated herein by reference.

This application is related to co-pending application Ser. No. 12/210,169 filed on Sep. 12, 2008, entitled "Composite electromechanical machines with gear mechanism"

The present invention relates generally to electromechanical machines, such as motor, generator, dynamo, or alternators, and particularly to composite electromechanical machines.

BACKGROUND

Electromechanical machines such as alternator(s), motor(s), dynamo(s), and generator(s) can convert energy between mechanical energy and electrical energy. For example, an electric motor uses electrical energy to produce mechanical energy, and a generator or dynamo uses mechanical energy to produce electrical energy. In general, an electromechanical machine can operate as a motor or as a generator, depending on the applied input energy. The major differences between a motor and a generator can be in the desired optimization, for example, a motor is designed to optimize speed or torque, and a generator is designed to optimize power generation. Thus the following descriptions are directed to electromechanical machine, which can be equally applied to motors and generator.

The electromechanical machine can convert between mechanical energy and electrical energy through magnetic interaction. From a mechanical point of view, the electromechanical machine comprises a stator which is a stationary part, and a rotor which is a rotating part. For example, a motor converts electrical power to mechanical power in its rotor, through a power supplied to the stator and/or the rotor. From an electrical point of view, the electromechanical machine comprises an armature which is the power-producing component (and which can be either the rotor or the stator), and the field component which is the magnetic field component (and which can also be either the rotor or the stator and can be either an electromagnet or a permanent magnet). The following descriptions use rotor and stator in describing electromechanical machine(s), which can be equally applied to armature(s) and field component(s). In addition, the following descriptions sometimes use the term "magnetic component" or "magnetic plane" of an electromechanical machine to represent either the stator, the rotor, the armature or the field component.

Electrical machines may take the form of DC motors or AC motors with various types such as induction, brushed, brushless, universal, stepper, linear, unipolar, reluctance. However, this classification is not a rigid distinction, especially with advances in electronic control, e.g., moving the commutator out of the motor shell.

There are several ways to supply/generate power to/from an electromechanical machine. In a motor, the supplied power can be from a DC source (DC motor), an AC source (AC motor), or induced in the rotating device (induction motor). AC source can be single-phase or polyphase power systems. For example, two-phase electrical power can have 4 or 3 wires to provide 2 voltage phases, differing by 90 degrees. Three-phase electric power provides 3 voltage phases, differing by 120 degrees. Polyphase power can provide any number of phases, usually three, or a multiple of three.

In addition, motors can incorporate single or double multiphase winding set that is connected to a power supply. For example, doubly-fed electric motors have two independent multiphase windings that actively participate in the energy conversion process, and thus can provide twice the constant torque speed range as singly-fed electric machines.

SUMMARY OF THE DESCRIPTION

Embodiments of the present invention include a composite electromechanical machine which can operate as a motor or a generator (including, but not limited to, dynamo or alternator). The present composite electromechanical machine comprises a double-sided magnetic plane (e.g., rotor or stator) with attached magnets protruding from an inner side and an outer side. The magnets allow a substantially equal magnetic field exerting influence on both sides of the double-sided magnetic plane.

In an aspect, the present composite electromechanical machine comprises at least two rotor/stator pairs integrated together. In an aspect, the two stators from the two rotor/stator pairs form a double-sided stator having an inner stator side and an outer stator side. The composite double-sided stator can replace two separate inner stator and outer stator in coupling with an inner rotor and an outer rotor, respectively. In an aspect, the two rotors from the two rotor/stator pairs form a double-sided rotor having an inner rotor side and an outer rotor side. The composite double-sided rotor can replace two separate inner rotor and outer rotor in coupling with an inner stator and an outer stator, respectively.

The stator and the rotors can comprise either a permanent magnet or a winding to generate a magnetic field. If the rotors comprise winding, a brush mechanism can be included to accommodate the winding. The composite electromechanical machine can be a brushless machine with the rotor comprising of at least one permanent magnet, and the double-sided stator comprising stator winding(s). The composite electromechanical machine can be a brush machine with the rotor (inner rotor, outer rotor or both rotors) comprising a winding, and the double-sided stator comprising of at least one permanent magnet.

In an embodiment, the double-sided magnetic plane (e.g., rotor or stator) has an inner side for coupling with an outer side of an inner magnetic plane (e.g., rotor or stator) and an outer side for coupling with an inner of an outer magnetic plane (e.g., rotor or stator). A plurality of magnets protrude from both sides of the double-sided magnetic plane(s) for exerting substantially equal magnetic field from both sides, interacting with the inner and outer magnetic planes.

In an embodiment, at least a single magnet (electromagnet or permanent magnet) extends from one side to the other side of the double-sided magnetic plane. In this configuration, the magnetic field is essentially the same at both sides of the double-sided magnetic plane. In an embodiment, a number of magnets forms a series of magnets extending from one side to the other side of the double-sided magnetic plane. The magnets can touch each other, and thus the magnetic field can be the same at both side of the double-sided magnetic plane. The magnets can have a gap in between, with or without a magnetic material connecting these magnets. The magnets are arranged to have little magnetic field escaping the magnets, thus providing essentially the same magnetic strength to both sides of the magnetic plane. The magnets can be permanent magnets, or electromagnets with windings.

In an embodiment, the composite electromechanical machine comprises additional pairs of rotor/stator. In an aspect, the inner rotor, the outer rotor, or both rotors can be a double-sided rotor, and the composite electromechanical machine further comprises a plurality of stators facing the plurality of double-sided rotors. In addition, the additional stator can also be a double-sided stator, and the composite electromechanical machine further comprises a plurality of double-sided stators facing the plurality of double-sided rotors.

Other embodiments can also be included.

DETAILED DESCRIPTION OF THE PREFERRED EMBODIMENTS

Embodiments of the invention include a composite motor or generator which comprises multiple rotor/stator pairs that are configured as a double-sided stator and/or double-sided rotor.

Figure 1:
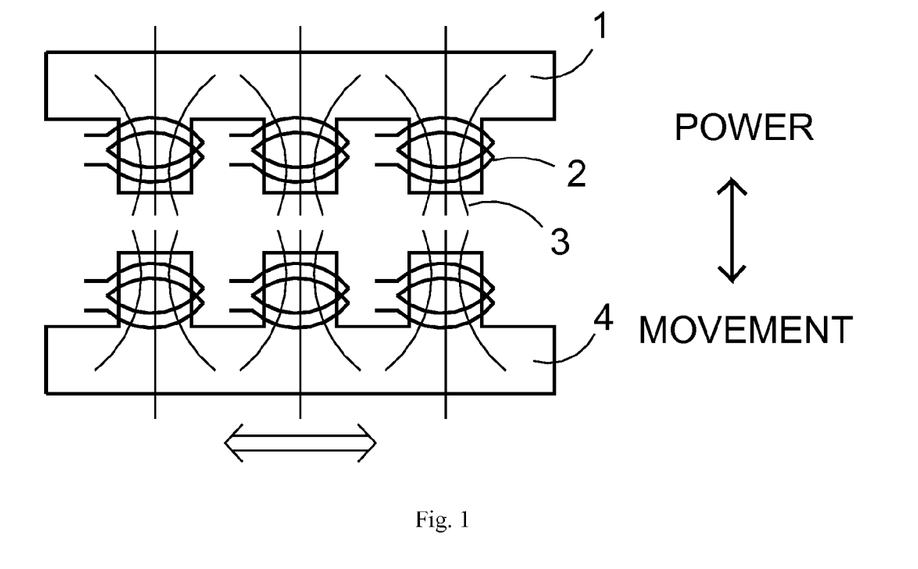
FIG. 1 illustrates an interaction of magnetic field(s) in electromechanical machine.
Figure 2A:
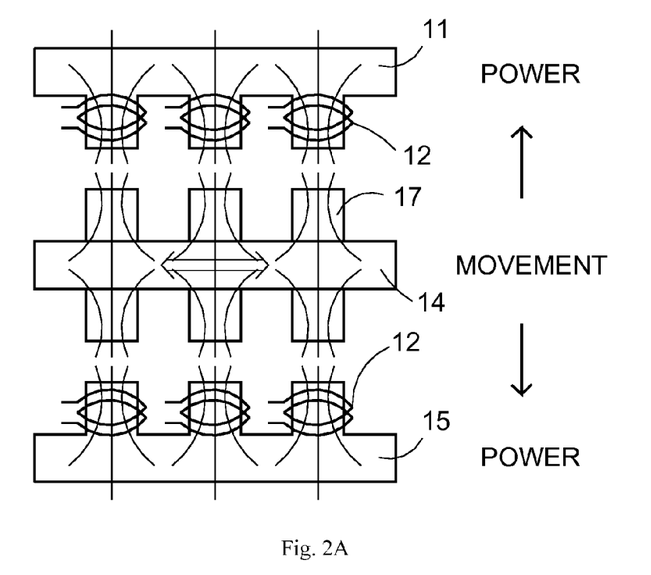
FIGS. 2A-2B illustrate schematic diagrams utilizing a double-sided rotor for generator and motor.

Motor or generator typically employs the interaction of magnetic field(s) as shown in FIG. 1. A power can be applied to a magnetic plane 1, for example, through the windings 2, to generate a magnetic field 3. Interaction of the magnetic field 3 with another magnetic plane 4 can provide a movement for this magnetic plane 4. Conversely, movement of the magnetic plane 4 can generate power within the windings 2 of the magnetic plane 1. In this configuration, certain magnetic field is directed away from the interaction, and thus not contribute to the power transfer FIG. 2A illustrates a schematic for a generator using a double-sided rotor, providing a better utilization of the magnetic field. The magnetic plane 14 has magnets 17 (either permanent magnet or electromagnet) generating magnetic field to two other magnetic planes 11 and 15. The magnetic plane 14 in this configuration is a double-sided rotor, and the movement of the magnetic plane 14 generates power in the windings 12 in the stationary magnetic planes 11 and 15. The composite generator includes a pair of stator 11 and rotor 14, together with a pair of stator 15 and rotor 14. The rotor 14 is double-sided, thus acting as two rotors for interacting with two stators 11 and 15.

Figure 2B:
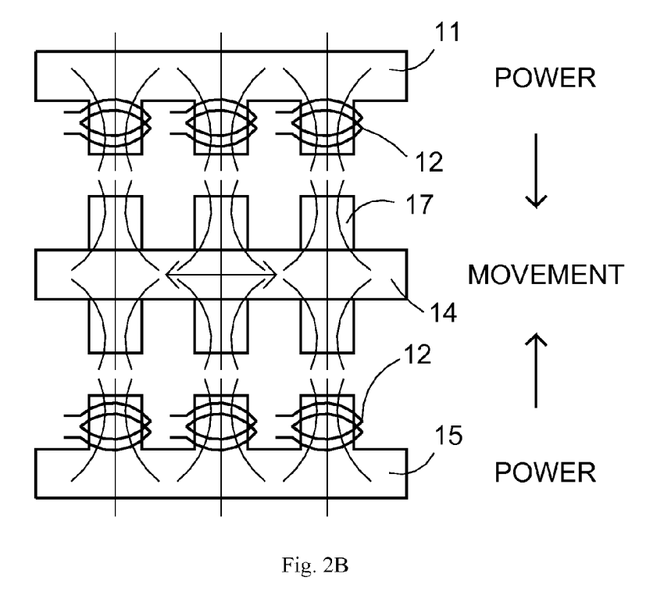

Similarly, FIG. 2B illustrates a motor utilizing a double-sided rotor with the same configuration as that of FIG. 2A. Power applied to the windings 12 of the stationary stators 11 and 15 generates a magnetic field, which interacts with the double-sided rotor 14 to move the rotor 14. In these configuration, a double-sided rotor can provide a composite machine, comprising two individual machines.

Figure 3A:
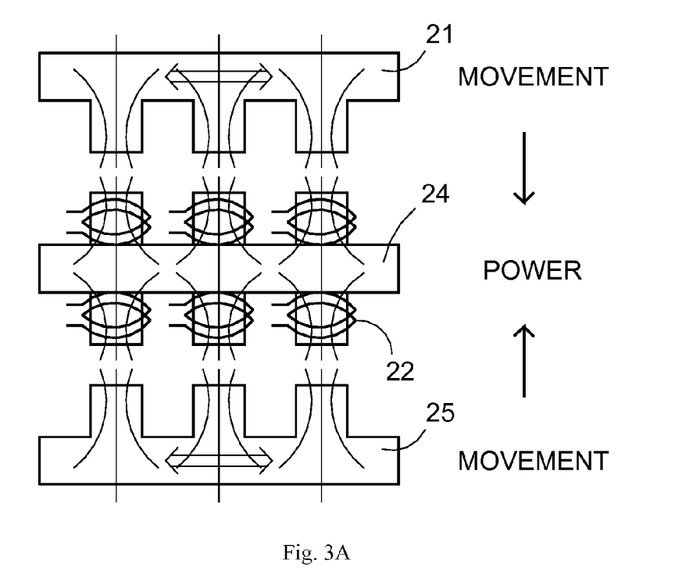
FIGS. 3A-3B illustrate schematic diagrams utilizing a double-sided stator for generator and motor.
Figure 3B:
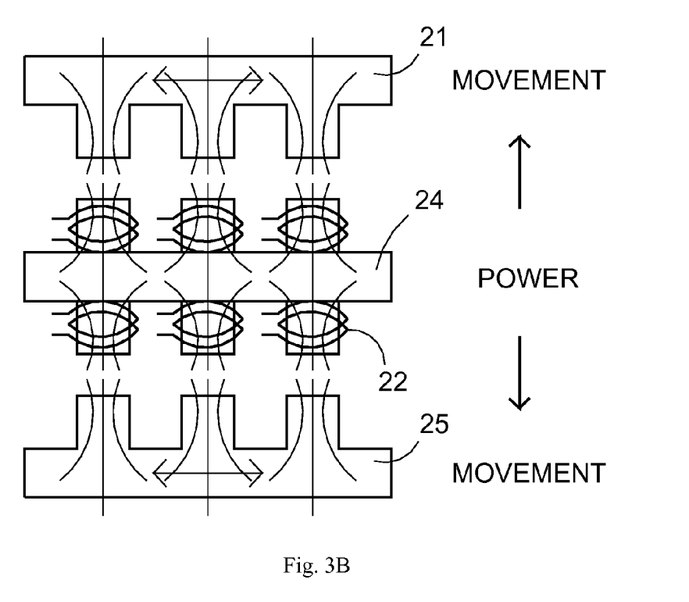

FIGS. 3A and 3B illustrate a schematic for a generator and a motor, respectively, using a double-sided stator 24. The movement of the inner and outer rotors 21 and 25 can generate a magnetic interaction in stator 24, leading to power generation in windings 22 (FIG. 3A). Conversely, power can be applied to the double-sided stator 24 to generate movement in both rotors 21 and 25 (FIG. 3B).

The present invention relates to an electromechanical machine employing a double-sided stator/rotor and dual rotors/stators, respectively, with windings or permanent magnet, with the magnets protruding from both sides of the double-sided stator/rotor. The present electromechanical machine can possess a variety of embodiments based on different structure of the windings and magnet arrangements, stator and rotor pairs, and magnet configurations. The electromechanical machine of the present invention can provide a high torque density, high efficiency and the low construction cost.

In an embodiment, the electromechanical machine preferably includes at least one double-sided stator and at least a rotor having inner and outer working sides. The stator is inserted between the inner and outer working sides of the rotor with air gap(s) between a rotor/stator surface pair, forming a rotor-stator/stator-rotor structure. The stator preferably includes an inner stator side, an outer stator side, generally has a hollow cylindrical shape, with permanent magnet or slotted or non-slotted with winding to form electromagnet. In an aspect, the stator has a winding with a plurality of polyphase windings of electrical wires. The rotor has a generally cylindrical shape which includes an inner rotor component and an outer rotor component. The rotor can also include two separate rotors, an inner rotor and an outer rotor.

In an embodiment, a plurality of permanent magnets is mounted to the working sides of the rotors to form a brushless configuration. Alternatively, windings can be employed on the rotors to form brushed configuration.

The present double-sided stator or rotor can fully utilize the magnetic force(s) of each magnet (electromagnet or permanent magnet), and the multiplying of the electric motor components. The present invention can provide an improvement over an existing motor/generator machine (brush, brushless, DC, AC, induction, etc.), converting to multiple layering, using more than one side of the electromagnetic forces to cause the rotation of addition rotating parts or elements. It also means the combination of multiple parts of an electric motor, combined or merged into a single source of electromagnetically induced torque, typical electric motor. The magnetic planes or layers encircle one another as a telescope's sections would when in its shortened or collapsed state. Each section's outer diameter is less than the next bigger sections inside diameter. Any number of electromagnetic planes, at any location can be made wider or narrower, allowing for additional electromagnetic planes to be fitted upon it, or made narrower to allow more than one electromagnetic planes to be fitted to another. The size of the machine is flexible, as it can be made to any size (length, width and height) and for any application. The present system uses multiple sources of the induced electromagnetic force to cause the rotation of one or more rotors in an electric motor having more than one rotor. In addition, sensors, such as Hall effect sensors, or the like, can be installed on any rotating, and/or surface(s)

Figure 4A:
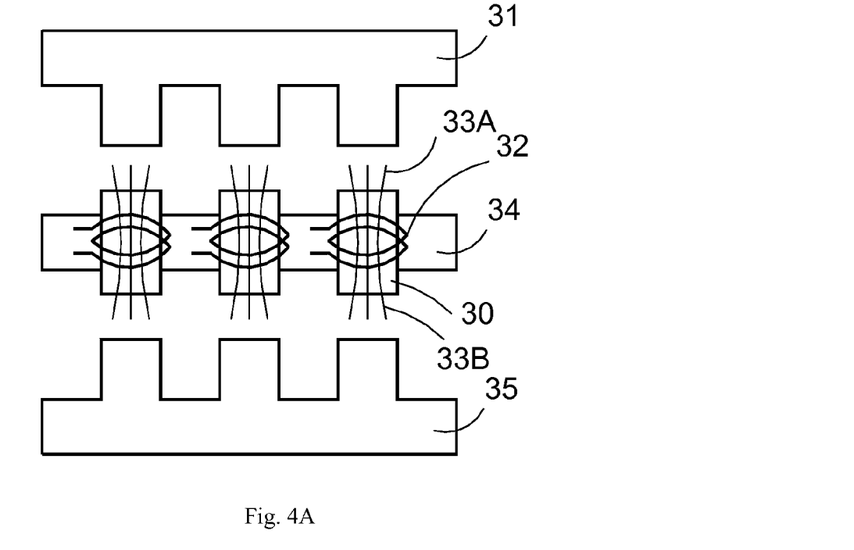
FIGS. 4A-4B illustrate an embodiment of the present electromechanical machine.

FIG. 4A illustrates a best mode of the preferred embodiment of the present invention, showing a double-sided magnetic plane (rotor or stator) 34 disposed between an inner magnetic plane (rotor or stator) 35 and an outer magnetic plane (rotor or stator) 31. The double-sided magnetic plane 34 comprises a plurality of magnet 30, generating magnetic field 33A and 33B from both sides, interfacing the outer magnetic plane 31 and the inner magnetic plane 35, respectively. The magnets 30 can be an electromagnet having a winding 32. In an aspect, the magnet 30 comprises a single piece of magnetic material, protruding from both sides of the magnetic plane 34, with the winding 32 to generate a substantially similar magnetic field 33A and 33b at both sides of the magnetic plane 34. The single piece of magnet 30 can form the double-sided magnetic plane, and simplify the construction of the composite electromechanical machine.

Figure 4B:
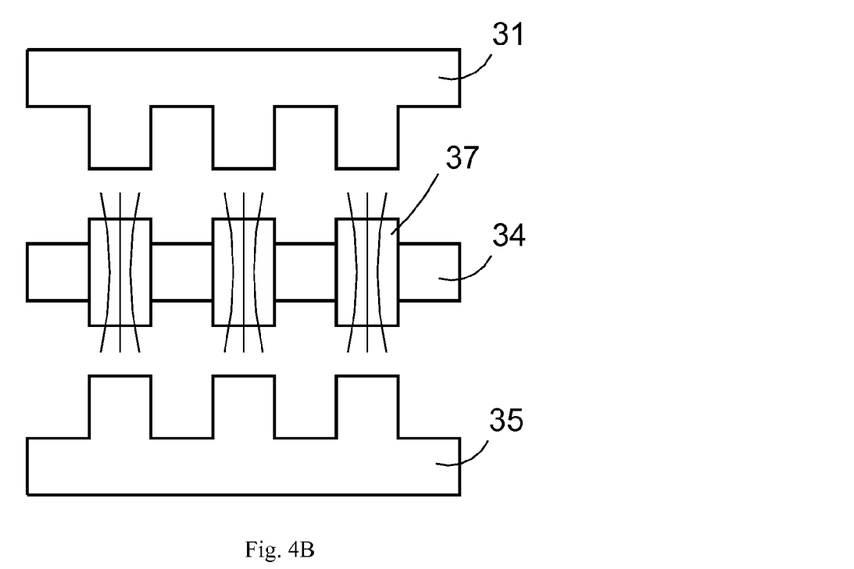

FIG. 4B illustrates an embodiment of the present double-sided magnetic plane, utilizing single piece permanent magnets 37 within the double-sided magnetic plane 34. Similar magnetic field can be established at both sides of the double-sided magnetic plane.

Figure 5A:
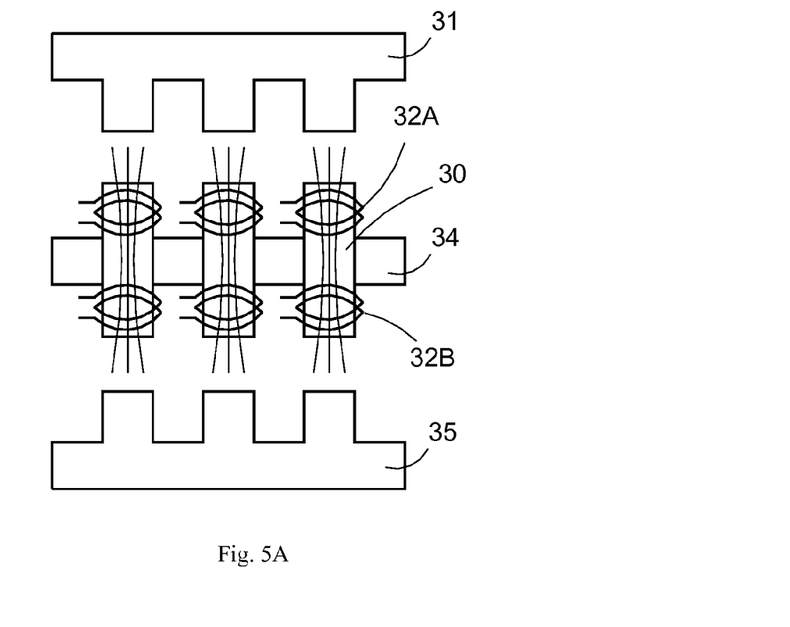
FIGS. 5A-5D illustrate other views of the double-sided stator machine.

FIG. 5A illustrates another embodiment of the present double-sided magnetic plane, utilizing single piece magnetic material 30 having two windings 32A and 32B facing the outer and inner magnetic plane 31 and 35. The windings 32A and 32B can be constructed to provide a magnetic field to both sides of the double-sided magnetic plane 34, preferably with minimum loss of magnetic field.

Figure 5B:
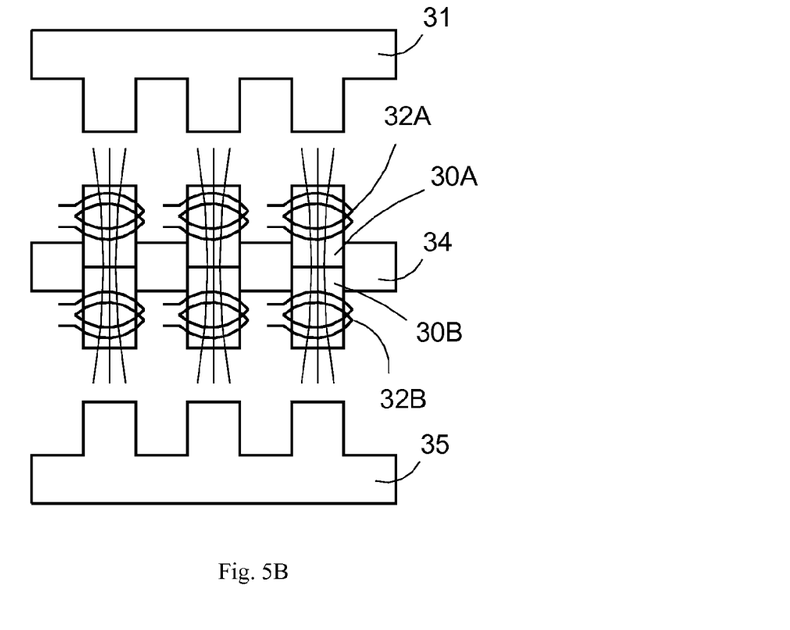

FIG. 5B illustrates another embodiment of the present double-sided magnetic plane, utilizing multiple pieces of magnetic material (for example, two pieces of 30A and 30B are shown) having two windings 32A and 32B facing the outer and inner magnetic plane 31 and 35. The pieces of magnetic material can be touching each other, as shown in this figure.

Figure 5C:
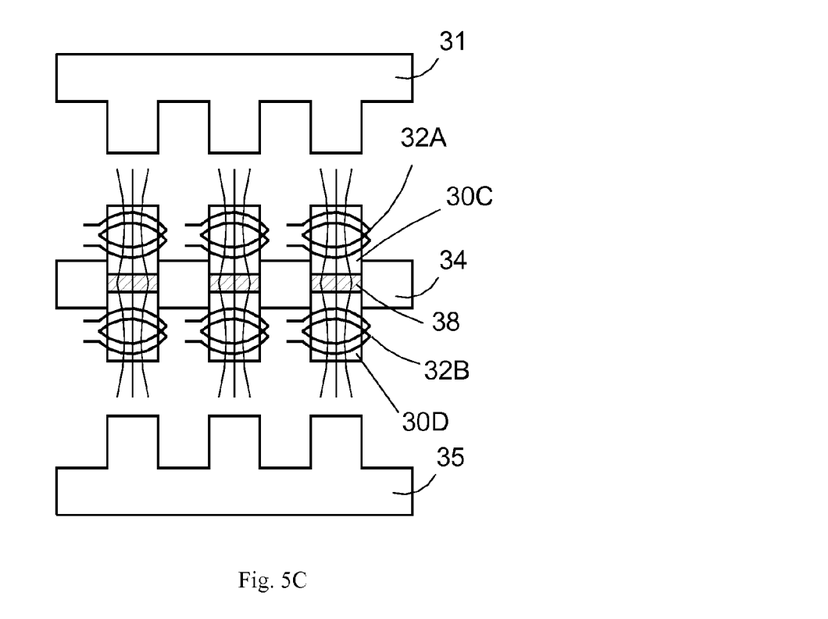
Figure 5D:
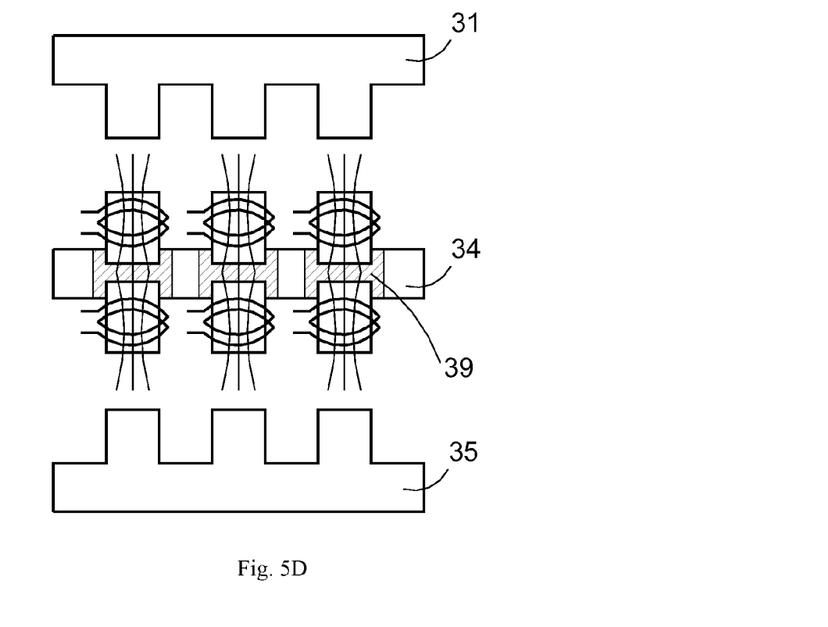

FIG. 5C illustrates another embodiment of the present double-sided magnetic plane, utilizing multiple pieces of magnetic material (for example, two pieces of 30C and 30D are shown) having two windings 32A and 32B facing the outer and inner magnetic plane 31 and 35. The pieces of magnetic material 30C and 30D can be separated by a separator 38 as shown in this figure. The separator can be made of magnetic material, to confine and prevent the loss of the magnetic field. The separator 38 can be at the same size as the pieces of the magnetic material 30C and 30D. Alternatively, the separator 39 shown in FIG. 5D can be larger (or smaller, not shown), depending on the optimization of the magnetic field.

Embodiments of the present invention present a novel type electric motor/generator with many unique concepts and configurations, such as the combination of at least two electric machines into one, effectively reducing the amount of needed materials and multiplying the output force by the number of machines combined.

In an embodiment, the machine can be a motor having low-speed high-torque. High-speed design can require a gearing arrangement to reduce the speed and increase the torque output. Low speed high torque motor can eliminate the need for a gearing arrangement, resulting in a significant benefit in cost, material consumption, and overall weight.

An embodiment focuses on the combination of two electric motors (or generators, or any combination of motors and generators). This is accomplished by using both sides of the stator, making a double-sided stator, and/or by using both sides of the rotor, making a double-sided rotor. Each one of these double-sided configurations is constructed to form a single plane (Stator Plane or Rotor Plane).

In an aspect, each type of plane is connected to the appropriate back plates. The stator back plate is held stationary and is the mounting point for the motor. The rotor back plate is connected to the output mechanism. The double-sided stator/rotor can be wound in any feasible manner and the windings can be either separate or combined as one. Alternatively, permanent magnets can be used.

The present electromechanical machine can be constructed with permanent magnets or electromagnets, and it can function as an alternator/generator producing electrical energy. The present machine can generate induced electrical energy through normal operation, for example, additional windings can be included into the design to produce electrical power from normal operation of the motor, without resistance to its normal rotation.

The individual magnets protrude from both sides of the magnetic plane, or at least have their magnetic force extending, and exerting influence, from the topside, bottom side and all side equally. Thereby, the double-sided stator or rotor fully utilizes the force of each magnet.

Typically the magnetic planes (rotor or stator planes) are planar or concentric. There can be any number of magnetic planes. Magnetic planes can be cylindrical in shape. Outer planes are hollow cylinder to allow for the insertion of a smaller diameter magnetic planes or the motors main transmission shaft. They are either a representation of a multi-sided/multidirectional stator/rotor, or a multi-sided armature/field. The magnetic planes can have each side wired individually, thereby giving full control of each of the magnetic planes, for whichever function is desired. The magnetic plane can be a multi-sided field/armature/stator/rotor having multiple sides. This plane is constructed on a magnetic plane. Generally, one magnetic plane is located on the outside surface of the double-sided magnetic plane while another one is located on the inside surface of the double-sided magnetic plane. In addition, other magnetic planes can be added at various other locations and directions and orientations.

The permanent magnets are preferably radially magnetized, but may be magnetized using blocked, tapered, parallel, or interleaved methods. In addition, the permanent magnets may be comprised of ferrite magnets or rare earth magnets.

The working surface includes a plurality of inwardly extending teeth to receive polyphase windings of electrical wires wound around the teeth. A plurality of polyphase windings of electrical wires are preferably toroidally-wound around the stator. The windings are preferably wound as back-to-back windings. The stator may be formed by a plurality of stacked laminations that are connected together, or alternatively, may be formed by a magnetic powdered material that is compressed together or some combination thereof. The windings wound around the stator may comprise toroidially-wound windings, lap windings, wave windings, or other types of windings know in the art.

Figure 6A:
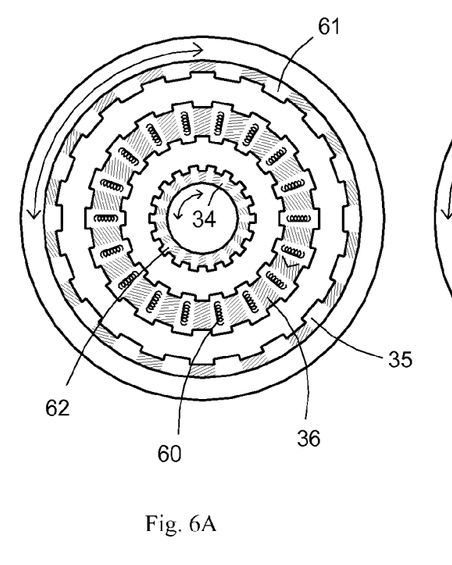
FIGS. 6A-6B illustrate brushless and brushed schematic diagrams with a double-sided stator.
Figure 6B:
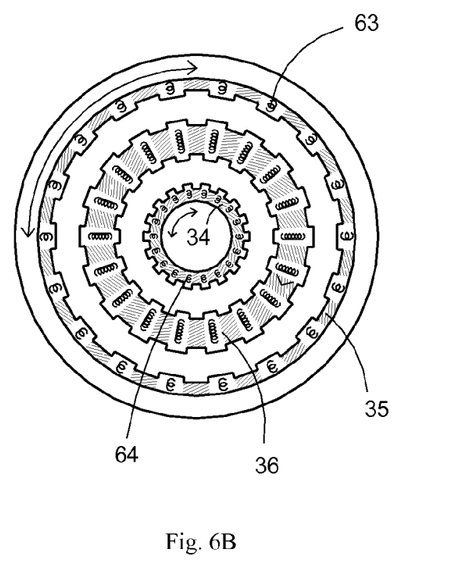

FIGS. 6A-6B illustrate an embodiment of the present machine, with the double-sided stator/rotor 36 comprising a plurality of electromagnet windings 60 for generating magnetic field(s) to an inner rotor/stator 34 and an outer rotor/stator 35. FIG. 6A shows a brushless embodiment where the rotors have permanent magnets 61 and 62. FIG. 6B shows a brushed embodiment where the rotors have electromagnet windings 63 and 64.

Figure 7:
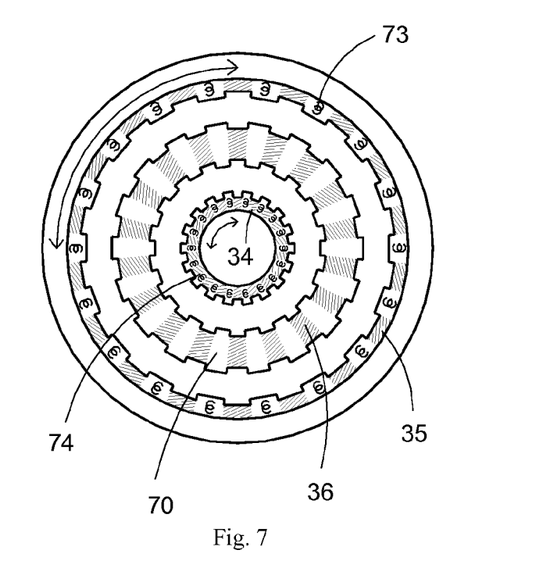
FIG. 7 illustrates a brushed schematic diagram with a double-sided stator.

FIG. 7 illustrates an embodiment of the present machine, with the double-sided stator/rotor 36 comprising a plurality of permanent magnets 70 for generating magnetic field(s) to an inner rotor/stator 34 and an outer rotor/stator 35. FIG. 7 shows a brushed embodiment where the rotors have electromagnet windings 73 and 74.

FIGS. 8A-8F illustrate various configurations for the present electromechanical machine having a double-sided stator (or rotor) and dual inner/outer rotors (or stators) working like two conventional machines, with one machine on the inside and the other machine on the outside.

Figure 8A:
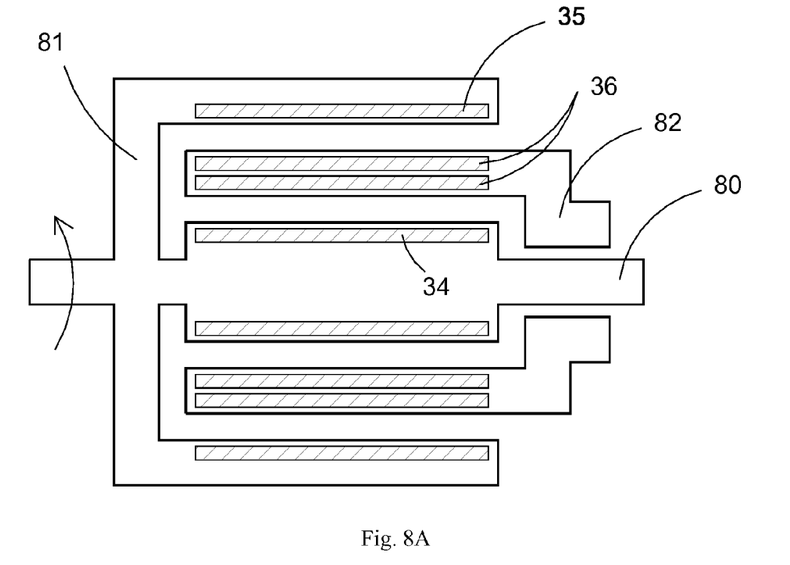
FIGS. 8A-8F illustrate various embodiments of the present machine.

FIG. 8A shows an embodiment of the present machine where the rotors and stators are attached to back plates 81 and 82. As shown, the back plate 81 is rotatable and contains the rotors 34 and 35, and the back plate 82 is stationary (or attached to the rotating axis 80 through a bearing mechanism) and contains the double-sided stator 36. Alternatively, the back plate 81 can be stationary with the rotors 34, 35 become stators, and the back plate 82 is rotatable with the double-sided stator 36 become a double-sided rotor. The magnetic planes (rotors or stators, 34, 35 and 36) can have embedded magnets (permanent or electromagnets) to provide interacting magnetic field. The magnets in the double-sided magnetic plane can provide substantially similar magnet field as disclosed above. The rotors and the double-sided stator can be coupled through a device that allows free axle rotation, such as a bearing (not shown).

Figure 8B:
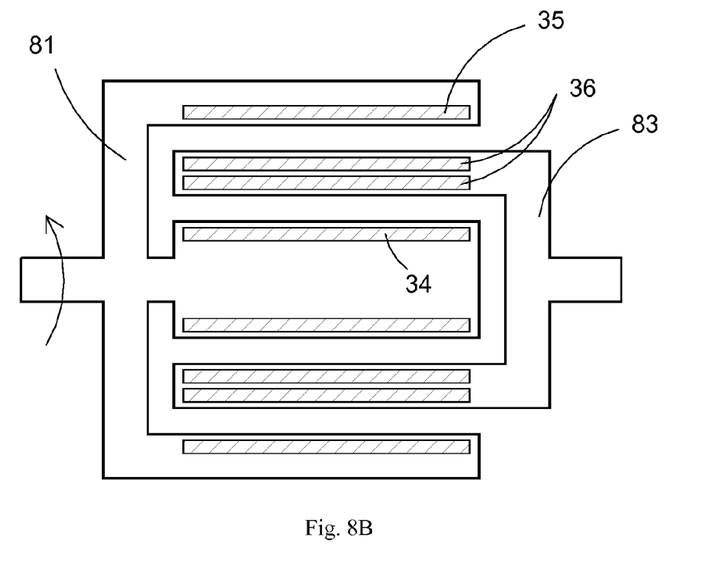

FIG. 8B shows an embodiment of the present machine where the rotors and stators planes are attached to a back plate 81 and 83. As shown, the back plate 81 is rotatable and back plate 83 is stationary, but in another embodiment, back plate 81 can be stationary and back plate 83 is rotatable. Alternatively, both back plates can be rotatable. Inside the electromechanical machine are several layers of magnetic planes, each one following the circumference of the machine at progressively smaller diameters. The magnetic planes can be a short solid or hollow cylinder with closed ends. The magnetic planes are partitioned in two sections, one section is stationary and one section is rotating. Either section can have permanent or electromagnets. If the rotating section contains the electromagnets then a brush assembly is required. If the rotating section contains the permanent magnets then a controlling/timing device is needed, instead of the brushes.

In an aspect, the back plates are constructed of a very high strength metal, plastic or an alloy, in which there is no flexibility, mainly to provide the strength and stability of the machine. These plates can also provide the enclosure. Each of the plates has affixed to them the magnetic planes, either the electromagnet planes or the permanent magnet planes. In an embodiment, between each of these equally spaced magnetic planes is a groove, which can allow the plane affixed to the other back-plate to have a mounting point. Also it can be a slide-bearing race allowing the planes to rotate freely while still providing great strength and stability to the machine, by providing a support on both sides of the planes.

In an aspect, the two back-plates will also be held to each other by a fastener assembly. The rotating back-plate can have a case around it with a bearing race allowing the rotating back-plate to be held in place and still able to move freely in a circular motion. In an embodiment, the back-plate can be slotted to create a fan like action with one side designed for intake and the other designed for exhaust, which provides positive airflow across the internals of the motor providing a cooling effect.

The magnetic plane is a curved rectangular plate, which contains a series of magnet, arranged in latitude, and sequenced in alternating polarity (e.g., positive, negative, positive, negative). These plains will have magnets attached to them in such a way as to allow the magnet to protrude through the plains allowing an equally powerful magnetic force to exert influence both on the in-side and the out-side of the plain. These magnets are strategically located as to provide the maximum amount of torque possible combined with the greatest efficiency. There is always one plane, which is situated above and below each other, except for the layer closet to the shaft, and the outer most layer as well. The electromagnet or group of electromagnets is designed to provide the greatest amount of torque, yet utilizing the least amount of electricity, thus effectively reducing the heat created within the motor, through the current flow.

In an embodiment, the machine can have a shaft or a shaft-sleeve. The concept behind the shaft sleeve is to provide for a stacking feature, where any number of motors can be added or removed, to/from a common shaft. This common shaft accommodates the possibility to combine the output of several electric motors onto one shaft, without the mechanical loss associated with gearing systems. In this configuration, the output force is multiplied by the number of motors on the shaft. Physical space and shaft strength are the only limitation for this stacking. An additional benefit of the stacking feature is instead of replacing the motor when the power requirement changes or it fails, just add or remove one or more motors.

The shaft of the machine can be made longer than the body of the motor having the shaft extended from the motor on either end or both depending on its application. This shaft can be used to add additional motors thereby creating a stack of motors. These additionally stacked motors can also function independently all the way down to the individual plane level in each of the separate motors. Alternately, the shaft can be replaced by a sleeve, hollowed and grooved inside, allowing for the insertion of a shaft. The shaft can be secured by any feasible method. This can facilitate the stacking of these motors. This common shaft sleeve accommodates the possibility to combine the output of several electric motors onto one shaft, without the mechanical loss associated with gearing systems. For example, the output force is multiplied by the number of motors on the shaft with physical space and shaft strength being the main limitation for this stacking. Further, each motor/generator can be powered on or off as needed.

The composite machine can be configured to combine their power, thus significantly increasing the torque or speed of a motor, or the power generation of a generator.

Figure 8C:
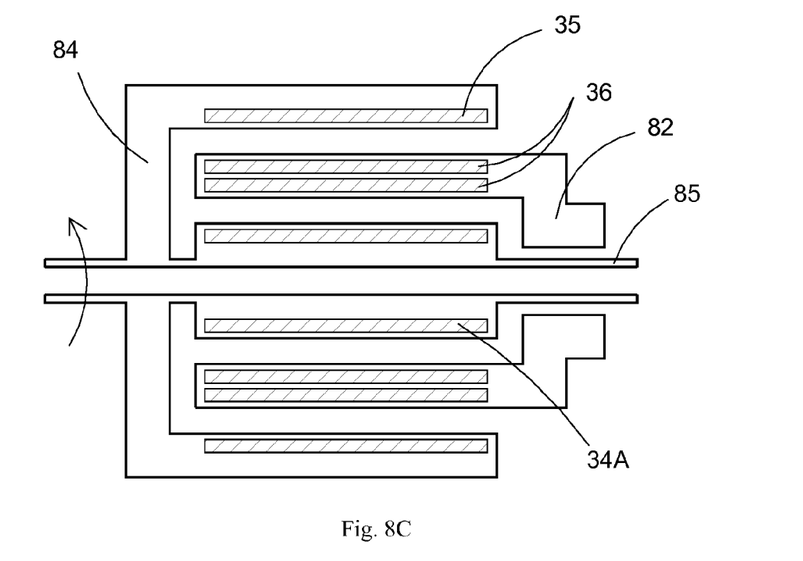

FIG. 8C shows an embodiment incorporating a shaft sleeve 85. The inner rotor 34A is a hollow cylinder to accommodate the shaft sleeve. Alternatively, the inner rotor can be a solid cylinder (not shown) where the shaft sleeve 85 is hollow outside the solid cylinder. The shaft sleeve 85 is connected to a back plate 84 for rotation. Alternatively, the back plate 84 and the shaft sleeve 85 are stationary, and the back plate 82 is rotatable.

In addition, cooling mechanism can be incorporated for cooling purpose. A fan mechanism at each end of the machine creates positive ventilation, such as a back-plate and a front-plate holding the rotors and stator can be slotted to create a fan-like action/effect. This can be used to provide sufficient airflow across the internals of the motor, providing a cooling effect. For example, a fan at one end is used for intake and slots/openings at the other end is used for exhaust. Any type of aspiration method can be used, as long as it or in combination with, can supply sufficient air intake for purposes of transferring heat. In addition, heat transfer for the machine can be increased and improved by the addition of highly conductive material(s) for thermal management. An attachment or method to hold a filtering device can be incorporated on all ends, or a permanent filter can be used.

Figure 8D:
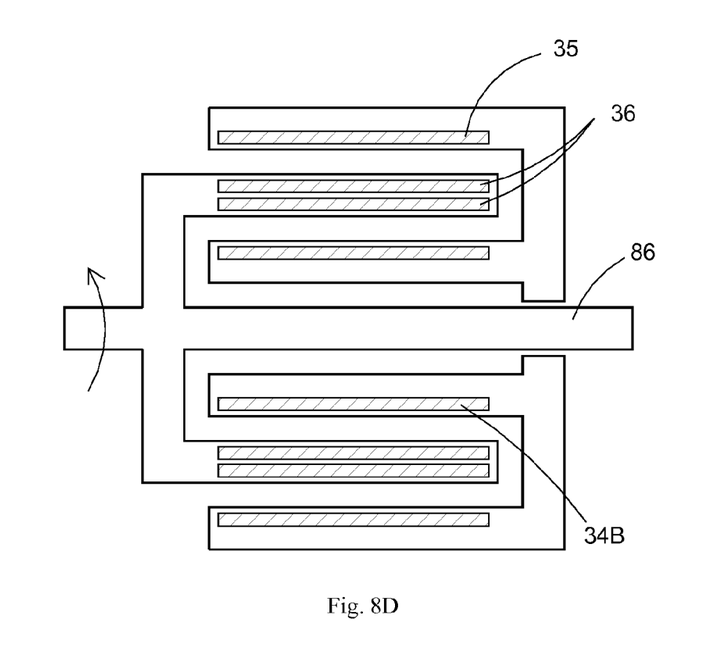

FIG. 8D shows an embodiment where the innermost rotor 34B is a hollow cylinder, with a shaft 86 (or a shaft sleeve, not shown) passing through.

Figure 8E:
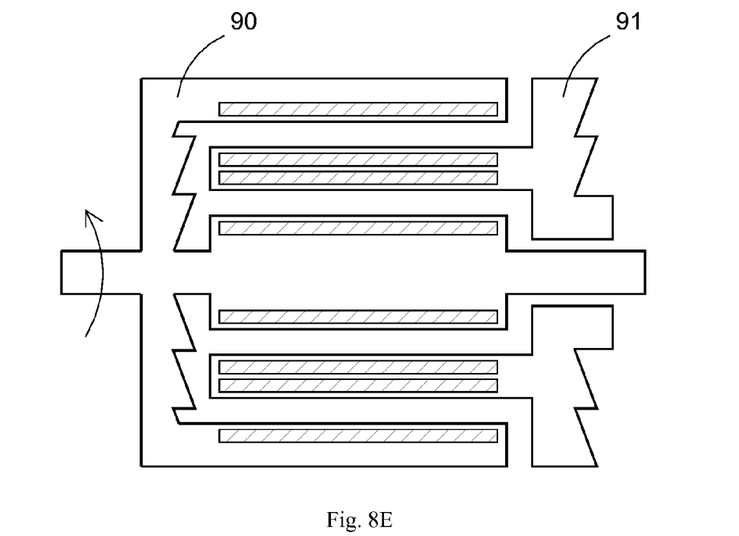

FIG. 8E shows an embodiment incorporating a fan mechanism at the ends of the rotor/stator pairs. Two fan-like blades 90 and 91 can be slotted to create an air flow across the rotors and stator for cooling purpose.

Figure 8F:
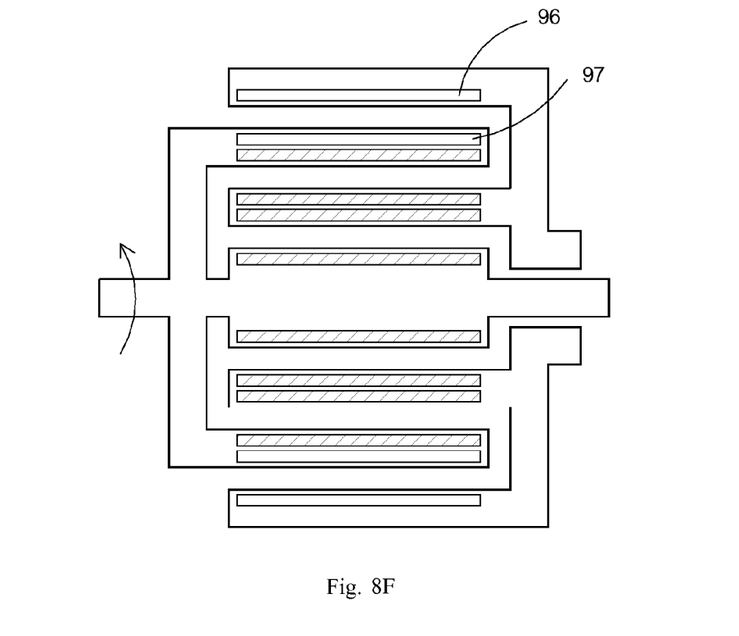

FIG. 8F shows an embodiment incorporating an additional rotor/stator pair. The outer rotor 35 is converted to a double-sided rotor 97 and an additional outer stator 96 is added. The incorporation of the addition rotor/stator pair can further enhance the power of the machine.

While the invention has been described with reference to preferred embodiments, it is to be understood that the invention is not intended to be limited to the specific embodiments set forth above. For example, features in one embodiment can be incorporated in other embodiments, such as fan-like ends of FIG. 8E can be used in multiple double-sided rotor/stator configuration in FIG. 8F.

What is claimed is:

1. An electromechanical machine comprising
a concentric magnetic layer comprising
an inner concentric magnetic layer comprising at least an inner magnet, the magnets having north-south poles arranged in radial directions; and
an outer concentric magnetic layer comprising at least an outer magnet, the magnets having north-south poles arranged in radial directions; and
a double-sided concentric magnetic layer having an inner side and an outer side, the inner side facing the inner magnetic layer and the outer side facing the outer magnetic layer,
wherein the double-sided magnetic layer comprises a plurality of electromagnets which protrude through the inner side and the outer side, the plurality of electromagnets providing substantially equally magnetic fields to the inner side and the outer side of the double-sided magnetic layer in interacting with the inner and the outer magnetic layers,
wherein the electromagnets comprise two windings facing the inner and the outer magnetic layers with independent windings,
wherein the innermost concentric magnetic layer comprises a through hollow center for inserting a shaft so that one or more eletromechanical machines can be added to or removed from a common shaft.

2. An electromechanical machine as in claim 1 wherein the plurality of magnets comprises permanent magnets.

3. An electromechanical machine as in claim 1 wherein the plurality of magnets comprises electromagnets having windings.

4. An electromechanical machine as in claim 1 wherein the plurality of electromagnets are touchedly connected together from the inner side to the outer side.

5. An electromechanical machine as in claim 1 wherein the plurality of electromagnets are coupled through a magnetic material section.

6. An electromechanical machine as in claim 1 wherein the double-sided magnetic layer is a double-sided stator.

7. An electromechanical machine as in claim 1 wherein the double-sided magnetic layer is a double-sided rotor.

8. An electromechanical machine as in claim 1
wherein at least one of the inner magnetic layer and the outer magnetic layer is a second double-sided magnetic plane, and
the electromechanical machine further comprises at least a second magnetic layer facing the second double-sided magnetic layer.

9. An electromechanical machine as in claim 1 further comprising a fan blade assembly for providing a positive air flow along the rotor and the stator.

10. An electromechanical machine comprising
a concentric magnetic layer comprising
an inner concentric magnetic layer comprising at least an inner magnet, the magnets having north-south poles arranged in radial directions; and
an outer concentric magnetic layer comprising at least an outer magnet, the magnets having north-south poles arranged in radial directions; and
a concentric double-sided magnetic layer having an inner side and an outer side, the inner side facing the inner magnetic layer and the outer side facing the outer magnetic layer with an equal number of magnetic poles between the layers,
wherein the double-sided magnetic layer comprises a plurality of permanent magnets, and
wherein at least a single permanent magnet protrudes through the inner side and the outer side.

11. An electromechanical machine as in claim 10 wherein the double-sided magnetic layer is selected from a group consisting of a double-sided stator and a double-sided rotor.

12. An electromechanical machine as in claim 10
wherein at least one of the inner magnetic layer and the outer magnetic layer is a second double-sided magnetic layer, and
the electromechanical machine further comprises at least a second magnetic layer facing the second double-sided magnetic layer.

13. An electromechanical machine as in claim 10 further comprising a fan blade assembly for providing a positive air flow along the rotor and the stator.

14. An electromechanical machine as in claim 10 wherein the electromechanical machine is a shaft-sleeve machine having a through hollow center for inserting a shaft.

15. A shaft-sleeve electromechanical machine having an axis of rotation, comprising
a first back plate having a hollow center for inserting a shaft;
a plurality of magnetic layers disposed on one side of the first back plate and concentrically along the axis of rotation, wherein the innermost magnetic layer of the plurality of magnetic layers have a hollow center for inserting a shaft;
a second back plate having a hollow center for inserting a shaft;
at least one double-sided magnetic layer disposed on one side of the second back plate, concentrically along the axis of rotation, and interspersed with the magnetic layers,
wherein a double-sided magnetic layer is disposed between two magnetic layers, and
wherein a magnetic layer and a double-sided magnetic layer form a rotor/stator pair,
wherein the shaft-sleeve electromechanical has a through hollow center so that a number of shaft-sleeve electromechanical machines can be added to a common shaft to combine output powers to the common shaft.

16. An electromechanical machine as in claim 15 wherein the double-sided magnetic layer comprises a plurality of magnets which protrude through the inner side and the outer side, the plurality of magnets providing substantially equally magnetic fields to the inner side and the outer side of the double-sided magnetic layer interacting with the inner and the outer cores.

17. An electromechanical machine as in claim 15 wherein the double-sided magnetic layer comprises a plurality of permanent magnets, and wherein at least a single permanent magnet protrudes through the inner side and the outer side.

18. An electromechanical machine as in claim 15 wherein the double-sided magnetic layer comprises a plurality of electromagnets, and wherein at least a single core of the plurality of the electromagnets protrudes through the inner side and the outer side.

19. An electromechanical machine as in claim 15 wherein the double-sided magnetic layer comprises a plurality of electromagnets and wherein the electromagnets comprise two windings facing the inner and the outer magnetic layers with independent windings.

* * * * *